US012680918B2

(12) United States Patent (10) Patent No.: US 12,680,918 B2

Vilkov et al. (45) Date of Patent: Jul. 14, 2026

(54) TRACE DETECTION OF LOW VOLATILE SUBSTANCES USING INDUCTIVE HEATING OF A SAMPLING SWAB

(71) Applicant: Analytical Detection LLC, Lake Forest, CA (US)

(72) Inventors: Andrey N. Vilkov, Aliso Viejo, CA (US); Jack Albert Syage, Corona del Mar, CA (US); Joseph Adam Widjaja, Laguna Hills, CA (US)

(73) Assignee: ANALYTICAL DETECTION LLC, Lake Forest, CA (US)

( * ) Notice: Subject to any disclaimer, the term of this patent is extended or adjusted under 35 U.S.C. 154(b) by 321 days.

(21) Appl. No.: 18/463,202

(22) Filed: Sep. 7, 2023

(65) Prior Publication Data

US 2025/0085197 A1     Mar. 13, 2025

(51) Int. Cl.
*G01N 1/02* (2006.01)
*G01N 1/44* (2006.01)
*G01N 30/12* (2006.01)
*G01N 30/72* (2006.01)
*G01N 30/00* (2006.01)

(52) U.S. Cl.
CPC ................. *G01N 1/02* (2013.01); *G01N 1/44* (2013.01); *G01N 30/12* (2013.01); *G01N 30/7253* (2013.01); *G01N 2001/028* (2013.01); *G01N 2030/008* (2013.01); *G01N 2030/128* (2013.01)

(58) Field of Classification Search
None
See application file for complete search history.

(56) References Cited

U.S. PATENT DOCUMENTS

| | | | |
|---|---|---|---|
| 3,992,174 A | * | 11/1976 | Nakamura ............. G01N 30/12 |
| | | | 436/158 |
| 4,408,125 A | | 10/1983 | Meuzelaar |
| 4,718,268 A | | 1/1988 | Reid et al. |
| 5,135,549 A | | 8/1992 | Phillips et al. |
| 5,988,002 A | | 11/1999 | Danylewych-May et al. |
| 6,345,545 B1 | | 2/2002 | Linker et al. |
| 7,458,283 B2 | | 12/2008 | Nacson et al. |
| 7,947,949 B2 | | 5/2011 | Chen et al. |
| 8,161,830 B2 | | 4/2012 | Boudries et al. |
| 8,756,975 B2 | | 6/2014 | Wu |
| 8,943,910 B2 | | 2/2015 | Addleman et al. |
| 9,528,969 B2 | | 12/2016 | Shaw et al. |
| 9,689,857 B1 | | 6/2017 | Vilkov et al. |
| 10,345,281 B2 | | 7/2019 | Kelley et al. |
| 10,458,885 B2 | | 10/2019 | Shaw et al. |

(Continued)

OTHER PUBLICATIONS

Response to Office Action dated Oct. 30, 2023 from U.S. Appl. No. 17/470,984, filed Jan. 30, 2024, 9 pp.

(Continued)

*Primary Examiner* — Daniel S Larkin

(74) *Attorney, Agent, or Firm* — Shumaker & Sieffert, P.A.

(57) ABSTRACT

An example system includes a conductive sampling swab and a thermal desorber comprising an induction coil. The thermal desorber defines an opening configured to receive at least a portion of the conductive sampling swab within an internal volume defined by the induction coil, and the thermal desorber is configured to inductively heat the sampling swab to a temperature sufficient to vaporize a sample material disposed on the sampling swab.

20 Claims, 13 Drawing Sheets

(56) References Cited

U.S. PATENT DOCUMENTS

| | | |
|---|---|---|
| 2005/0019220 A1 | 1/2005 | Napoli |
| 2005/0288616 A1 | 12/2005 | Bozenbury, Jr. et al. |
| 2015/0004710 A1 | 1/2015 | Gregory |
| 2015/0323430 A1 | 11/2015 | Weling et al. |
| 2016/0025605 A1 | 1/2016 | Weling et al. |
| 2016/0233068 A1 | 8/2016 | Arnold et al. |
| 2017/0254732 A1 | 9/2017 | Pawliszyn |
| 2018/0284081 A1 | 10/2018 | Shaw et al. |
| 2019/0368976 A1* | 12/2019 | Blair .................... G01N 33/227 |
| 2020/0033233 A1 | 1/2020 | Thomson et al. |
| 2023/0069942 A1 | 3/2023 | Vilkov et al. |

OTHER PUBLICATIONS

Extended Search Report from counterpart European Application No. 24198614.0 dated Jan. 23, 2025, 9 pp.

Final Office Action from U.S. Appl. No. 17/470,984 dated May 20, 2024, 14 pp.

Response to Final Office Action dated May 20, 2024 from U.S. Appl. No. 17/470,984, filed Jul. 22, 2024, 8 pp.

Notice of Allowance from U.S. Appl. No. 17/470,984 dated Aug. 20, 2024, 11 pp.

All About Electronic Circuits, "Flat spiral coil inductor calculator", 2 pp., Retrieved from the Internet on Dec. 5, 2023 from URL: https://www.circuits.dk/calculator_flat_spiral_coil_inductor.htm.

AZo Materials, "What is Ferritic Stainless Steel?", AZoNetwork, Apr. 10, 2020, 8 pp., URL: https://www.azom.com/article.aspx?ArticleID=19195.

Coil 32, "Calculate influence of shield on the inductance value", Influence of the shield, Apr. 12, 2015, 1 pp., URL: https://coil32.net/shield-inductance.html.

Collins, "Hysteresis loss and eddy current loss: What's the difference?", Motion Control Tips: A Design World Resource, WTWH Media LLC, Mar. 30, 2018, 4 pp., URL: https://www.motioncontroltips.com/hysteresis-loss/.

Highton, "Round Wire ac Resistance Calculator", Chemandy Electronics Ltd., Sep. 30, 2011, 5 pp., URL: https://chemandy.com/calculators/round-wire-ac-resistance-calculator.htm.

Induction Partner, "Austenitic or ferritic stainless steel, induction heating efficiency.", ID Partner, 2 pp., Retrieved from the Internet on Dec. 5, 2023 from URL: https://induction-partner.com/blog/2020/05/06/austenitic-or-ferritic-stainless-steel-induction-heating-efficiency/.

Karia, "4116 Steel vs 1095—What's the Difference", The Piping Mart, Jul. 18, 2023, 9 pp., URL: https://blog.thepipingmart.com/metals/4116-steel-vs-1095-whats-the-difference/.

Knight, "Wire Resistance at Various Frequencies", Amateur Radio Station VE3EFC, 6 pp., Retrieved from the Internet on Dec. 5, 2023 from URL: http://ve3efc.ca/wireohms.htm.

Landgraf et al., "On the Steinmetz hysteresis law", Journal of Magnetism and Magnetic Materials, vol. 320, No. 20, Elsevier B.V., Oct. 1, 2008, pp. e531-e534, URL: https://www.sciencedirect.com/science/article/abs/pii/S0304885308004150.

Najarro et al., "Optimized thermal desorption for improved sensitivity in trace explosives detection by ion mobility spectrometry", vol. 137, No. 11, Mar. 27, 2012, pp. 2614-2622, URL: https://tsapps.nist.gov/publication/get_pdf.cfm?pub_id=907306.

Nave, "Faraday's Law", 4 pp., Retrieved from the Internet on Dec. 5, 2023 from URL: http://hyperphysics.phy-astr.gsu.edu/hbase/electric/farlaw.html.

Nave, "Magnetic Field of Current Loop", 2023, 4 pp., Retrieved from the Internet on Dec. 5, 2023 from URL: http://hyperphysics.phy-astr.gsu.edu/hbase/magnetic/curloo.html.

Prosecution History from U.S. Appl. No. 17/470,984, dated Jul. 24, 2023 through Oct. 30, 2023, 26 pp.

RF Heating Consult, "Induction", Heating Consult: Induction Heating & RF Specialists, 1 pp., Retrieved from the Internet on Dec. 5, 2023 from URL: https://inductionheating.nl/inductie/?lang=en.

Sabry, "Magnetic Levitation: The Complete Physics of the Fastest Train Ever Built", Oct. 29, 2022, 467 pp.

Singh et al., "Eddy Current Loss Calculator", Calculatoratoz, Softusvista Inc., 3 pp., Retrieved from the Internet on Dec. 5, 2023 from URL: https://www.calculatoratoz.com/en/eddy-current-loss-calculator/Calc-34242.

Singh et al., "Hysteresis Loss Calculator", Calculatoratoz, Softusvista Inc., 3 pp., Retrieved from the Internet on Dec. 5, 2023 from URL: https://www.calculatoratoz.com/en/hysteresis-loss-calculator/Calc-34207.

Stainless Steel Guide et al., "Is Stainless Steel Magnetic? . . . It Depends", Jul. 6, 2022, 12 pp., URL: https://stainlesssteelguide.com/is-stainless-steel-magnetic-it-depends/.

Staymates et al., "The effect of reusing wipes for particle collection", International Journal for Ion Mobility Spectrometry, vol. 19, Springer, Nov. 4, 2015, pp. 41-49.

Untreated_Paramediensis_Karnik et al., "What is the main mechanism for induction heaters (cookers)?", Physics, Stack Exchange Inc, Jul. 11, 2019, 17 pp., Retrieved from the Internet on Dec. 5, 2023 from URL: https://physics.stackexchange.com/questions/491092/what-is-the-main-mechanism-for-induction-heaters-cookers.

Wikipedia, "Coercivity", Wikimedia Foundation, Inc., Nov. 19, 2023, 5 pp., Retrieved from the Internet on Dec. 5, 2023 from URL: https://en.wikipedia.org/wiki/Coercivity.

Wikipedia, "Remanence", Wikimedia Foundation, Inc., Jun. 27, 2023, 4 pp., Retrieved from the Internet on Dec. 5, 2023 from URL: https://en.wikipedia.org/wiki/Remanence.

Wikipedia, "Skin effect", Wikimedia Foundation, Inc., Nov. 29, 2023, 13 pp., Retrieved from the Internet on Dec. 5, 2023 from URL: https://en.wikipedia.org/wiki/Skin_effect.

Response to Extended Search Report dated Jan. 23, 2025, from counterpart European Application No. 24198614.0 filed Sep. 4, 2025, 9 pp.

* cited by examiner

200

280

272

240

232

230

220

260

270

250

274

252

210

I

I 500 ng KClO₃
@ 5 seconds of desoption profile

[ClO₃]⁻  [ClO₃+dopant]⁻

[dopant]⁻

500

Time (μs)

Intensity

10 μg KClO₄
@ 5 seconds of desoption profile

[ClO₃+dopant]⁻

[ClO₃]⁻

[ClO₄+dopant]⁻

[ClO₄]⁻

[dopant]⁻

600

Time (μs)

Intensity

800

| | |
|---|---|
| COLLECT A SAMPLE BY SWIPING A SURFACE OF INTEREST WITH A CONDUCTIVE SAMPLING SWAB | 802 |
| INSERT THE CONDUCTIVE SAMPLING SWABINTO A THERMAL DESORBER | 804 |
| HEAT THE CONDUCTIVE SAMPLING SWAB VIA INDUCTIVE HEATING | 806 |
| ANALYZE THE SAMPLE VAPORS | 808 |
| IDENTIFY THE SAMPLE | 810 |

TRACE DETECTION OF LOW VOLATILE SUBSTANCES USING INDUCTIVE HEATING OF A SAMPLING SWAB

TECHNICAL FIELD

The disclosure relates to methods and systems for detection of a chemical substance.

BACKGROUND

Trace detection systems are designed to collect, analyze, and identify minute amounts, such as picograms or nanograms, of substances of interest that may otherwise be invisible to the unaided eye. Substances of interest to be detected by trace detection systems include explosives, drugs, chemical weapons, and toxic industrial chemicals. Traditionally, the trace particles are collected by an operator (e.g., a natural person) using a sampling swab. The operator swipes a suspected surface with a sampling swab and inserts the sampling swab into a thermal desorber. The thermal desorber heats the sampling swab by convective heating to evaporate the particles collected on this swab. The released vapors are ionized and subsequently analyzed. Ion Mobility Spectrometry (IMS) and Mass Spectrometry (MS) trace detectors are commonly used methods to detect explosive, narcotics, and chemical weapon threats with high sensitivity and rapid analysis capabilities.

SUMMARY

In general, this disclosure describes techniques for trace detection of low volatility substances or materials. The techniques described involve using inductive heating to desorb and vaporize low volatility substances captured by an impermeable conductive sampling swab.

In one example, this disclosure describes a system including: a conductive sampling swab; and a thermal desorber comprising an induction coil, wherein the thermal desorber defines an opening configured to receive at least a portion of the conductive sampling swab within an internal volume defined by the induction coil, wherein the thermal desorber is configured to inductively heat the sampling swab to a temperature sufficient to vaporize a sample material disposed on the sampling swab.

In another example, this disclosure describes a method including: inserting a conductive sampling swab at least partially within an internal volume defined by an inductive coil of a thermal desorber; inductively heating the conductive sampling swab, with the induction coil, to a temperature sufficient to vaporize a sample material disposed on the conductive sampling swab.

In another example, this disclosure describes a conductive sampling swab including: a non-mesh substrate, wherein the conductive sampling swab is configured to be inductively heated to a temperature sufficient to vaporize a sample material disposed on the conductive sampling swab.

The details of one or more examples are set forth in the accompanying drawings and the description below. Other features, objects, and advantages will be apparent from the description and drawings, and from the claims.

DETAILED DESCRIPTION

Figure 1:
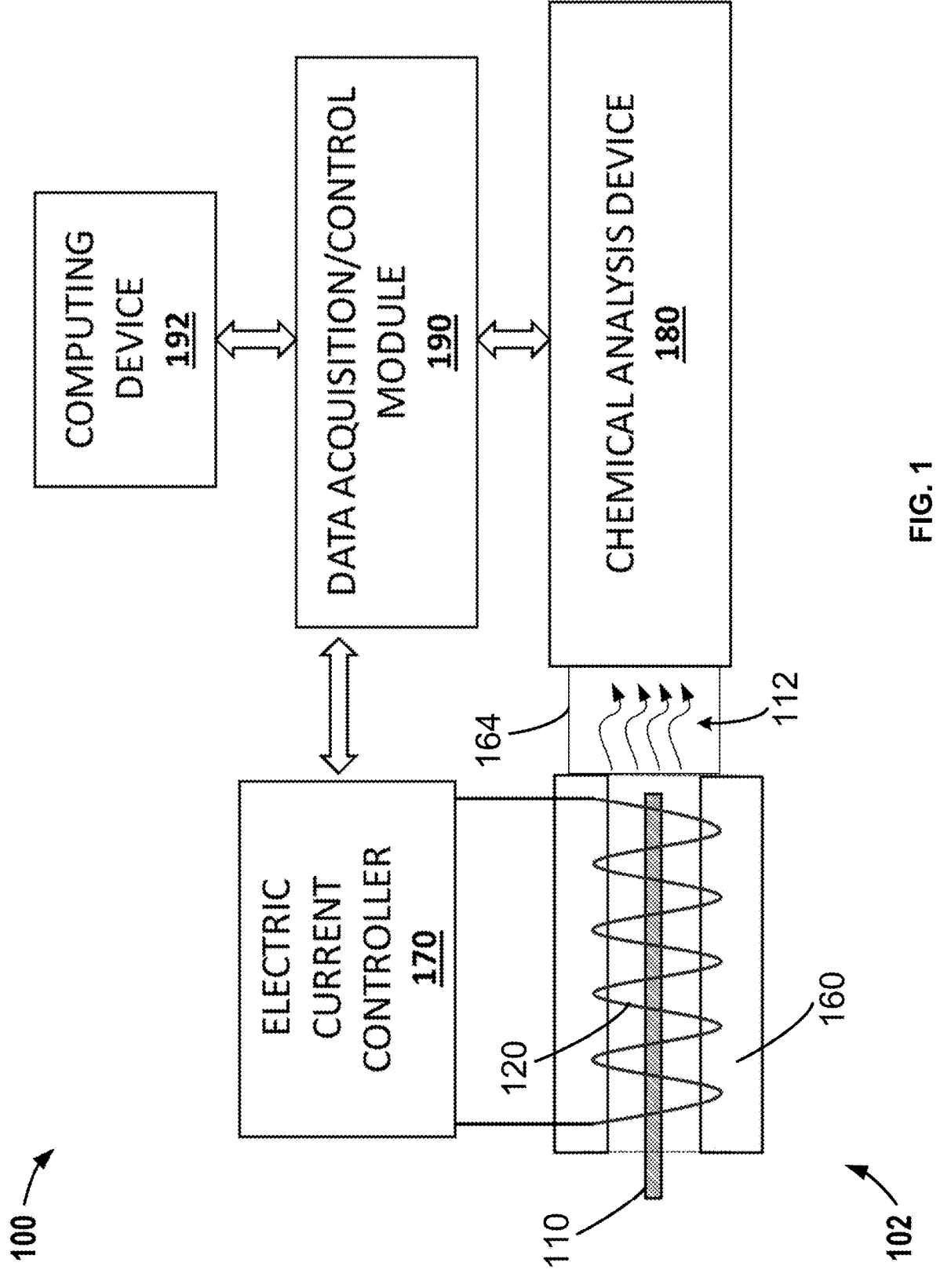
FIG. 1 is a block diagram illustrating an example trace detection system.

The disclosure describes techniques for trace detection of sample materials. In some examples, the techniques disclosed include a conductive sampling swab having an impermeable substrate, e.g., substantially gas, water, and/or air impermeable and/or non-transmissive to a gas, water, water vapor, moisture, air. For example, the conductive sampling swab may be continuous (e.g., non-mesh), such that gas, water or water vapor, or air may not pass or transmit through the thickness of the conductive sampling swab, e.g., within a period such as hours and/or days.

For trace detection, the heating of some sample materials to high temperatures may cause the sample to decompose into volatile compounds through a pyrolysis process. The resulting volatile compounds may be then separated and identified using, for example, ion mobility, gas chromatography (GC) or mass spectrometry. Pyrolysis Gas Chromatography (Py-GC) is a powerful technique for trace detection because it allows for the analysis of small amounts of sample and can provide detailed information about the composition of trace compounds. By subjecting the sample to pyrolysis, even complex and non-volatile compounds can be converted into smaller, volatile fragments that are amenable to gas chromatographic separation and detection. By combining pyrolysis and gas chromatography, Py-GC enables the detection and identification of trace compounds, even in complex samples with low concentrations. Py-GC may be used in various fields, including environmental analysis, forensic science, food and flavor analysis, and materials characterization. The use of a gas chromatograph with a sensitive detector, such as a mass spectrometer (e.g., GC-MS), enhances the detection capabilities.

Physically swiping surfaces is a common method for collecting sample materials that may be of security and/or forensic interest. The sampling swabs are typically porous allowing trace particles to be trapped within pores or to attach by other mechanical means. Fiber-based swabs may include natural fibrous materials, such as muslin and cellulose, and/or synthetic materials, such as Nomex® and Teflon™-coated fiberglass. The porosity of a sampling swab may be designed to match the maximum dimensions of measured and/or simulated size distributions for particle sizes of common explosive and narcotic materials. However, the porosity or roughness of a sampling swab can cause abrasion of the sampled surface causing unintended surface (matrix) material to adhere to the sampling swab in addition to the sample material and potentially interfere with the detection of the sample material.

After the sample is collected, the swab is inserted into a thermal desorber and heated to release the vapors of collected chemical substances. It is commonly accepted that slow heating rates are preferential for enhanced sensitivity, e.g., low or slow heating rates give clearer desorption separation between compounds with low vapor pressure versus high vapor pressure. Thermal desorbers may have a toaster-like design where the air gap between the flat heaters and sampling swab limits the heating rate and also serve as a conduit directing released vapors into a chemical analyzer.

Sampling swabs should be durable, free of impurities, and capable of withstanding high temperatures. The temperatures of the thermal desorber used for detection of explosive and narcotic samples may be limited to about 240 degrees Celsius (° C.), even though some compounds of interest, such as inorganic salts, may require temperatures of 700° C. or higher to efficiently desorb from the swab surface. For example, the thermal desorber may be limited by the power and time required to convectively heat the swab, or heat the swab via infrared radiation, inside a hot enclosure with limited heat transfer, e.g., through a volume of air in which the swab is positioned. Additionally, the swab itself may not be able to withstand temperatures significantly above 250° C.

Further, accumulation of moisture, e.g., water and/or water vapor, inside the pores of sampling swabs exposed to ambient conditions may degrade the performance of trace detectors. For example, water vapor loaded into an IMS trace detector along with the sample material may cause ion peak positions to be substantially shifted from their known positions.

Generally, trace detection systems and methods may focus on sample collection efficiency, e.g., to increase a detectable signal. However, methods for improvement of trace system sensitivity based on a cumulative response of a chemical substance may be impractical.

In accordance with the systems and methods disclosed herein, trace detection and trace detection systems may focus on improving the signal-to-noise ratio of a chemical substance of interest within just a subset of consecutive scans. In some examples, the heating rate of a sampling swab may be increased, rather than decreased, to allow one or more substances of interest to be sampled over a shorter period of time and thereby increase a peak signal intensity of one or more of the substances of interest. In some examples, the increased heating rates are achieved via inductive heating of a conductive sampling swab. For example, a system may include a thermal desorber defining an opening configured to receive at least a portion of the conductive sampling swab within an internal volume defined by the induction coil, and the thermal desorber may be configured to inductively heat the sampling swab using the induction coil. In some examples, the techniques of the present disclosure provide for improved detection of substances having a low volatility (e.g., explosives) through heating of an impermeable conductive sampling swab via induction. As used herein, "conductive" reference to the conductive sampling swab refers to electrical conductivity, however, in some examples, the conductive (e.g., electrically conductive) sampling swab may also be a thermally conductive sampling swab.

In accordance with the examples described herein, the conductive sampling swab may be configured to heat via inductive heating to a temperature sufficient to vaporize a sample material disposed on the conductive sampling swab. In some examples, the conductive sampling swab may be a non-mesh swab, such as a metal foil, and may be substantially conformable and elastic, e.g., conformable to a surface during swabbing but able to regain and/or retain its shape after swabbing. For example, the conductive sampling swab may be a spring steel, such as 1095 spring steel. In some examples, the conductive sampling swab may be a relatively thin, monolithic foil (e.g., a thin, conformable, elastic 1095 spring steel foil). In some examples, the conductive sampling swab may be a non-stainless steel, e.g., a spring steel such as 1095 spring steel.

In some examples, the conductive sampling swab may be magnetic so as to be heated via magnetic hysteresis, e.g., by hysteresis losses in addition to, or alternatively to, eddy currents. The conductive sampling swab may include a material having magnetic properties that enable generation of large amounts of heat due to hysteresis losses in response to an alternating magnetic field. For example, the conductive sampling swab may have a retentivity and coercivity such that an alternating magnetic field hysteresis curve of the conductive sampling swab has a substantially large area, e.g., the retentivity of the conductive sampling swab may be greater than or equal to a threshold retentivity and the coercivity of the conductive sampling swab may be less than or equal to a threshold coercivity (e.g., or greater than or equal to the absolute value of a threshold coercivity, which may be stated as a negative value). Additionally, the conductive sampling swab may be substantially heat resistant, e.g., having a relatively high melting point that is greater than 1000 degrees Celsius (C). Additionally, the conductive sampling swab may have a substantially high yield strength, elasticity, and resilience, e.g., such that the sampling swab may be conformable when swabbing a surface to collect a sample and then to retain its shape after swabbing.

In some examples, a conductive sampling swab comprises a non-mesh substrate, e.g., such as a metal foil. Optionally, the conductive sampling swab may comprise a coating, e.g., a metallization coating, disposed on a major surface of a substrate (e.g., a mesh or a non-mesh substrate). The conductive sampling swab may be a configured to retain a sample material, e.g., on a major surface of the conductive sampling swab such as a major surface of the non-mesh substrate (e.g., which may be a monolithic metal foil) or optionally a major surface of a coating disposed on a substrate. The conductive sampling swab may be configured to be inductively heated to a temperature sufficient to vaporize the sample material, e.g., via eddy currents and/or magnetic hysteresis losses.

In some examples, the conductive sampling swab may be configured to be heated via flash heating. For example, the thermal desorber may cause a power source, e.g., a voltage or current source, to cause an alternating current to flow through, or an alternating voltage to be applied across, the induction coil with the conductive sampling swab inserted within the induction coil to flash heat the conductive sampling swab to the temperature sufficient to vaporize the sample material with a relatively high heating rate, e.g., to greater than or equal to 500° C., or 600° C., or 700° C., or higher, within in a relatively short period of time, e.g., within a few minutes or within a few seconds. For example, the conductive sampling swab may be durable and thin, e.g., with a low thermal mass allowing the mass to heat at the relatively high rate. The conductive sampling swab may also be configured to be heated to higher temperatures than conventional swabs, enabling desorption of involatile chemical compounds such as inorganic salts, e.g., to a temperature equal to or greater than 500° C., or 600° C., or 700° C., or higher.

In some examples, the conductive sampling swab may be non-abrasive and non-porous, e.g., the conductive sampling swab may reduce collection of "substrate" materials, e.g., materials that are not of interest but upon which materials of interest may be disposed and upon which the conductive sampling swab is swabbed, such as vinyl or plastics. For example, the conductive sampling swab may have a reduced abrasion with the substrate material while still collecting the sample material of interest. In other words, the conductive sampling swab may reduce and/or eliminate contamination (e.g., by substrate materials), increase the signal-to-noise ratio, and reduce and/or eliminate false positives and/or false negatives in identification of the presence of a sample material of interest. In some examples, the conductive sampling swab may reduce and/or eliminate accumulation of water or moisture on or within the conductive sampling swab (e.g., by having at least a substantially non-porous, non-mesh swabbing surface), allowing the sampling swab to be used and/or stored in a variety of environmental conditions (e.g., different ambient temperatures and/or humidity during storage and/or sample collection or swabbing).

FIG. 1 is a block diagram illustrating an example trace detection system 100. In the example shown, system 100 includes conductive sampling swab 110, a thermal desorber 102 including an induction coil 120, an electric current controller 170 electrically coupled to induction coil 120, a chemical analysis device 180 fluidically coupled to thermal desorber 102, a data acquisition/control module 190 communicatively coupled to electric current controller 170 and chemical analysis device 180, and a computing device 192 communicatively coupled to data acquisition/control module 190. The example shown in FIG. 1 is representative of conductive sampling swab 110 at least partially received within an internal volume defined by induction coil 120 and in position to be heated. In some examples, conductive sampling swab 110 may be insertable and removable from the internal volume of induction coil 120, e.g., to allow for sample collection or swabbing (e.g., a surface) with conductive sampling swab 110.

Conductive sampling swab 110 may be configured to be used by an operator to physically swipe a surface of interest and collect an amount of a sample material on a surface of conductive sampling swab 110, e.g., such that the amount of sample material is disposed on conductive sampling swab 110. Conductive sampling swab 110 may be configured to be held by the operator by hand (e.g., with or without gloves) or by an extended sample holder or wand, or by any other suitable means. Conductive sampling swab 110 may be configured to be placed in thermal desorber 102, e.g., by hand or by the extended sample holder or wand, or by any suitable means. For example, the operator may place conductive sampling swab 110 inside enclosure 160 after swiping sampling swab 110 to collect an amount of a sample material.

Conductive sampling swab 110 may have structural and material properties that improve collection and subsequent inductive heating of the sample material. Improved collection of the sample material may include conformability of the conductive sampling swab 110 to a surface during collection, shape retention of conductive sampling swab 110 after collection is complete, and reduced collection of materials other than the sample material. Improved inductive heating of the sample material may include faster heating of the sample material in response to an alternating magnetic field.

In some examples, conductive sampling swab 110 may include a non-mesh substrate, e.g., a substrate that is not a knit, woven, or knotted material of open texture. The non-mesh substrate may comprise a metal or metal alloy. For example, conductive sampling swab 110 may include a metal foil formed of, e.g., a carbon steel or spring steel, such as 1095 carbon steel, or any suitable metal. In some examples, conductive sampling swab 110 may be substantially elastic, that is, conductive sampling swab 110 may resume its normal shape after being stretched or compressed. For example, conductive sampling swab 110 may be configured to be bent, stretched, or otherwise deformed, e.g., to at least partially conform to the shape of a surface that an operator is swiping with conductive sampling swab 110, and return to its original size and/or shape after being bent, stretched, or deformed. In some examples, conductive sampling swab 110 may have a Young's modulus greater than or equal to 9,000 kilopounds per square inch (ksi) and/or a resistivity greater than or equal to 5 microOhm-centimeters ($\mu\Omega$-cm).

In some examples, conductive sampling swab 110 may be magnetized by an application of an external magnetic field. In some examples, conductive sampling swab 110 may be configured to be inductively heated to a temperature sufficient to vaporize the sample material disposed on conductive sampling swab 110. Vaporizing of the sample material may include conversion of substantially all of the sample material to a vapor using thermal energy, such as through evaporation, sublimation, or thermal decomposition. To vaporize a wide range of substances in the sample material, conductive sampling swab 110 may be configured to be thermally stable at high temperatures. For example, conductive sampling swab 110 may be configured to withstand being heated to temperatures equal to or greater than 500° C., or 700° C., without vaporizing, melting, or thermally decomposing material comprising conductive sampling swab 110, e.g., without vaporizing the non-mesh substrate, coating, and/or any other layers or materials comprising conductive sampling swab 110, e.g., such as intermediate coatings and/or binder or primer layers.

Thermal desorber 102 is configured to inductively heat conductive sampling swab 110 using a varying magnetic field generated by induction coil 120. For example, thermal desorber 102 may include induction coil 120, and induction coil 120 may be configured to be electrically connected to a voltage or current source, e.g., electric current controller 170. Current controller 170 may be configured to cause an alternating current to flow through induction coil 120 to inductively heat conductive sampling swab 110 within the internal volume defined by induction coil 120. For example, induction coil 120 may be configured to generate alternating magnetic fields that induce eddy currents within or on a surface of conductive sampling swab 110, and/or that cause hysteresis losses within or on conductive sampling swab 110. At least a portion of the energy coupled to eddy currents and/or hysteresis losses is then converted to heat, which heats conductive sampling swab 110.

In the example shown, enclosure 160 may include a sample opening, or aperture, through which an operator may insert or remove conductive sampling swab 110 into the volume defined by induction coil 120. In some examples, enclosure 160 may be sealed (fully or partially) to prevent surrounding air and/or contaminants from entering chemical analysis device 180, e.g., via a vapor collection assembly (not shown) and/or vapor conduit 164. For example, enclosure 160 may include a clamp or other positioning device that clamps to the surfaces of conductive sampling swab 110 that extend out from enclosure 160, e.g., to seal the inner volume defined by enclosure 160 for a conductive sampling swab that is partially inserted into enclosure 160. In other examples, enclosure 160 is configured to receive all of conductive sampling swab 110 (not shown), with all or part of conductive sampling swab received within the internal volume defined by induction coil 120, and enclosure 160 may include a door or port which may be opened or closed to insert and remove conductive sampling swab 110. In other examples, enclosure 160 may include a port sized such that there is a small, or no, gap between edges of the port and conductive sampling swab 110 once conductive sampling swab is inserted into the port and the internal volume defined by induction coil 120. With small or no gaps, enclosure 160 may be configured to minimize or eliminate fluid communication with the internal volume defined by enclosure 160 through the port, and/or enclosure 160 may be configured to have an overpressure within the volume defined by enclosure 160 to reduce or prevent contaminants from entering the volume within enclosure 160 and/or remove contaminants from within enclosure 160. In some examples, enclosure 160 may be heated to avoid condensation of vapors of chemical substances inside enclosure 160.

Thermal desorber 102 may include a vapor collection assembly (not shown), which may be configured to collect vapor 112 including vaporized sample material that has been vaporized from conductive sampling swab 110. The vapor collection assembly may be fluidically connected to vapor conduit 164, both of which may be fluidically coupled to chemical analysis device 180 and configured to cause vapor to flow to chemical analysis device 180, e.g., via a fan. In some examples, any or all the vapor collection assembly, vapor conduit 164, or chemical analysis device 180 may be configured to ionize vapor 112.

In some examples, thermal desorber 102 may be configured to flash heat conductive sampling swab 110 to a temperature sufficient to vaporize the sample material disposed on the conductive sampling swab 100, e.g., in a few seconds or less. In some examples, the flash heating may comprise heating conductive sampling swab 110, e.g., via inductive heating, to the temperature in, or five seconds or less, or two seconds or less. In some examples, the temperature sufficient to vaporize the sample material disposed on the conductive sampling swab may be greater than or equal to 500° C., or 700° C. In some examples, the sample material may comprise at least one of an explosive, a narcotic, a chemical warfare agent, a pesticide, a toxic industrial chemical, or a pharmaceutical trace contaminant. In some examples, the sample material may comprise at least one of sodium nitrate, potassium nitrate, strontium nitrate, barium nitrate, sodium chlorate, potassium chlorate, sodium perchlorate, potassium perchlorate, sodium permanganate, or potassium permanganate. Thermal desorber 102 may be configured to vaporize any of the above-mentioned sample materials, e.g., heat conductive sampling swab 110 to a temperature sufficient to vaporize any of the above sample materials.

Chemical analysis device 180 may be a trace-detector configured to determine any or all of the presence of vaporized sample material, a composition of sample material, an amount of the sample material, and/or an absolute or relative amount of each component of the composition of the sample material. In some examples, chemical analysis device 180 may be an ion mobility spectrometer, a semiconductor gas sensor, a Raman spectrometer, a mass spectrometer, a gas chromatograph, a chemiluminescence-based detector, an electrochemical sensor, an infrared spectrometer, or any suitable trace-detector or any combination thereof.

Computing device 192 may include a processor and/or processing circuitry and memory, and may be configured to control trace detection system 100 and/or any of its components, e.g., thermal desorber 102, electric current controller 170, chemical analysis device 180, data acquisition/control module 190, and/or any other hardware of trace detection system 100, e.g., a pump to move vapor 112 to chemical analysis device 180, and the like. In some examples, computing device 192 may be substantially similar to computing device 28 further illustrated and described below with reference to FIG. 9.

In some examples, data acquisition/control module 190 may be configured to control trace detection system 100 and/or any of its components, e.g., based on instructions from processing circuitry of computing device 192. In some examples, processing circuitry and/or memory of computing device 192 may be configured to receive data from data acquisition/control module 190 and/or chemical analysis device 180, and processing circuitry of computing device 192 may be configured to determine any of the presence of vaporized sample material, a composition of sample material, an amount of the sample material, and/or an amount of each component of the composition of the sample material.

By using conductive sampling swab 110 to vaporize the sample material through induction heating, trace detection system 100 may be configured to more quickly and/or accurately analyze the sample material. As one example, conductive sampling swab 110 may be configured to collect the sampling material with a smaller amount of non-sample material compared to sampling swabs having less conformable or elastic materials. As another example, conductive sampling swab 110 may be configured to more quickly heat the sample material due to advantageous magnetic properties of conductive sampling swab 110, which may not be limited to materials having high corrosion resistance.

Figure 2:
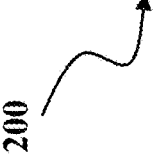
FIG. 2 is a schematic illustration of an example system including an induction coil and a conductive sampling swab.

FIG. 2 is a schematic illustration of perspective, exploded view of an example assembly 200 including an induction coil assembly 260, conductive sampling swab 210, and transfer line 280. Assembly 200 may be an example of enclosure 160 and induction coil 120 of FIG. 1, except for the differences described herein. Alternatively, in some examples, enclosure 160 of FIG. 1 may include assembly 200. Conductive sampling swab 210 may be substantially similar to conductive sampling swab 110 of FIG. 1 and/or conductive sampling swab 210 illustrated and described below with reference to FIG. 3A.

In the example shown, assembly 200 includes assembly sections 220 and 230, and a recess 232. Recess 232 may be configured to mate with and hold transfer line 280 in position so as to fluidically connect a lumen of transfer line 280 and the internal volume defined by induction coil 240. Assembly sections 220 and 230 may be made of a material configured to withstand high temperatures, e.g., without vaporizing or outgassing material of assembly sections 220 and 230. In some examples, assembly section 220 and 230 may be made of aluminum. Assembly sections 220 and 230 may be configured to hold induction coil assembly 260, e.g., such that the internal volume of induction coil 240 is in fluid communication with transfer line 280.

In the example shown, induction coil assembly 260 includes front and back plates 270, 272, and side structures 250, 252. Front plate 270 may include an aperture 274 (e.g., a slot) configured to receive conductive sampling swab 210, and back plate 272 may include one or more apertures configured to fluidically connect the volume defined by induction coil 240 within induction coil assembly 260 with transfer line 280. Front and back plates 270, 272 and side structures 250, 252 may be made of an electrically noncon-ductive material configured to withstand high temperatures, e.g., without vaporizing or outgassing material of front and back plates 270, 272 or side structures 250, 252. In some examples, front and back plates 270, 272 and side structures 250, 252 may be made of quartz. In some examples, side structures 250, 252 may be quartz rods, e.g., substantially cylindrical.

Front and back plates 270, 272, and side structures 250, 252 may be configured to provide structure for winding induction coil 240. For example, front and back plates 270, 272 maybe configured to be attached to and separate side structures 250, 252 to define a width of the internal volume defined by induction coil 240. Side structures 250, 252 may be configured to have a conductor (e.g., a wire) comprising induction coil 240 wound about side structures 250, 252, and side structures 250, 252 may have a thickness defining a height of the volume defined by induction coil 240. Side structures may extend in the length direction to define a length of the volume defined by induction coil 240. In the example shown, induction coil 240 is wound about side structures 250, 252 so as to have a spiral, flat shape, although induction coil 240 may have any suitable shape, e.g., a cylindrical shape. In some examples, induction coil 240 may comprise an air-core induction coil, e.g., an induction coil 240 without a material, such as a magnetic material, within the coil.

When assembled, induction coil assembly 260 may form an enclosure that is least partially sealed, e.g., such that air may enter or exit only through aperture 274 substantially near conductive sampling swab 210 (when inserted) and the lumen of transfer line 280. In some examples, induction coil assembly 260 may be configured to reduce and/or eliminate vapor condensation, e.g., induction coil assembly 260 may be heated. In some examples, induction coil assembly 260 may be heated by a flat ceramic heater (not shown). In some examples, transfer line 280 may be heated, e.g., by a flexible Kapton heater (not shown). In some examples, induction coil assembly 260 may be controlled, e.g., via controller 270 and or computing device 292, to be at a temperature of about 150° C., and transfer line 280 may be controlled to be at a temperature of about 180° C.

Induction coil 240 may be configured to be electrically connected to a voltage or current source, e.g., via a wire comprising induction coil 240 which may extend from induction coil 240, or a connector configured to electrically connect to induction coil 240. For example, induction coil 240 may be configured to be electrically connected to electric current controller 170. Electric current controller 170 may be configured to apply a relatively low alternating voltage or conduct a relatively low alternating voltage supplied by the voltage/current source, to induction coil 240 and cause an alternating electric current to flow through induction coil 240. In some examples, the alternating volt-age applied to induction coil 240 may be 3 volts or less, and the alternating electrical current may have a root mean square (RMS) range from 10 amperes (A) to 50A.

Figure 3A:
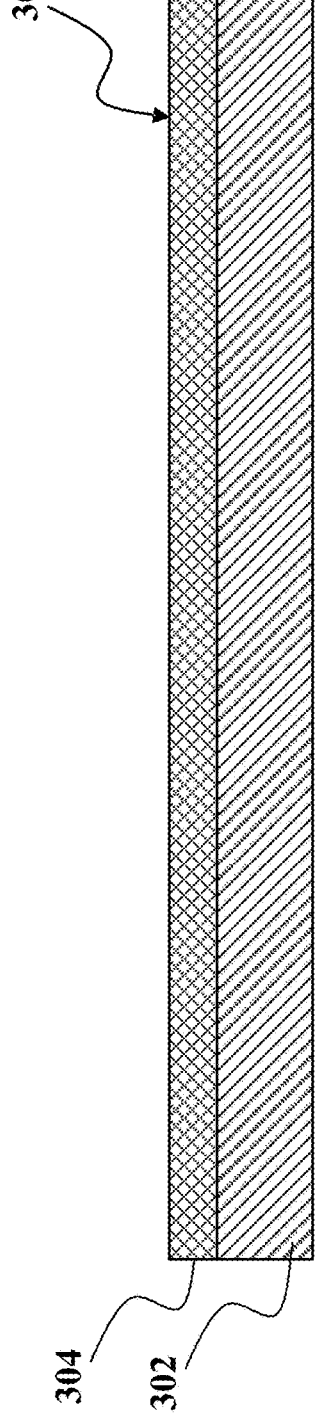
FIG. 3A is a cross-sectional view of an example conductive sampling swab.

As mentioned above, conductive sampling swab 210 may be flexible, non-abrasive, capable of inductively heating in a short amount of time, and thermally stable at high tem-peratures required to vaporize the sample material. FIG. 3A is a cross-sectional side view of a portion of conductive sampling swab 210, the cross-section being taken along line I-I as shown in FIG. 2. Conductive sampling swab 210 includes substrate 302, coating 304, and surface 306. In some examples, conductive sampling swab 210 includes additional layers, e.g., a primer or binder layer (not shown) between substrate 302 and coating 304 configured to increase and/or improve adhesive of coating 304 to substrate 302. In some examples, conductive sampling swab 210 may not include coating 304, and surface 306 may be a surface of substrate 302 rather than coating 304.

Substrate 302 may be a non-mesh substrate. A non-mesh substrate may include any substrate that does not include a regular pattern of discontinuities extending through the substrate (e.g., through holes). For example, substrate 302 may be a nonwoven material. In some examples, substrate 302 may be a continuous and/or substantially solid material, e.g., a metal foil. In other examples, substrate 302 may be non-mesh and include one or more through holes. In some examples, substrate 302 may be patterned, for example, substrate 302 may be a metal foil stamped with a pattern to reduce weight and/or surface area, e.g., so as to reduce a thermal mass and inductively heat at a greater rate.

At least a portion of conductive sampling swab 210 is conductive. In some examples, substrate 302 may be con-ductive, and in other examples substrate 302 may be sub-stantially non-conductive and coating 304 may be conduc-tive. For example, substrate 302 may comprise a non-conductive material, such as a fiberglass, Nomex®, or any other suitable non-conductive material, and coating 304 may be conductive. In some examples, substrate 302 may com-prise a composite material, e.g., conductive, non-conduc-tive, or a composite of both conductive and non-conductive materials.

Substrate 302 may be substantially non-absorbent. For example, substrate 302 may be a solid material, or a porous material sealed by coating 304, and substrate 302 may be configured to not trap and/or absorb fluids, such as water.

In some examples, substrate 302 may be substantially impermeable, e.g., substantially gas, water, and/or air imper-meable and/or substantially non-transmissive to a gas, water, water vapor, moisture, and/or air. In some examples, sub-strate 302 may have a water vapor transmission rate (WVTR) of less than or equal to 0.01 grams per meter squared per day (g/(m$^2$*day)) For example, the conductive sampling swab may be continuous such that gas, water or water vapor, or air may not pass or transmit through the thickness of the conductive sampling swab, at least within a substantial period of time such as hours and/or days.

Substrate 302 may be a metal or metal alloy substrate, such as a metal foil, and may be configured to retain a sample material, e.g., any of, but not limited to, the sample materials described herein. In some examples, the metal foil may be a carbon steel, a spring steel, such as 1095 spring steel, or any suitable metal or alloy or combination thereof. In some examples, substrate 302 may comprise a plurality of fibers and a filler or binder material, e.g., filling fiber gaps.

Substrate 302 may have any thickness suitable for using conductive sampling swab 210, e.g., a thickness enabling conductive sampling swab 210 to be handled, used as a swab, and inductively heated to the temperature sufficient to vaporize a sample material. In some examples, substrate 302 may have a thickness greater than or equal to about 10 micrometers and less than or equal to about 130 micrometers.

Coating 304 may be a graphite coating, a graphene coating, or any suitable coating or combination thereof. In some examples, coating 304 may be electrically conductive, e.g., coating 304 may include conductive material and/or a metal, such as a carbon steel, a spring steel (e.g., 1095 spring steel), or any suitable metal or alloy or combination thereof. In other examples, coating 304 may be non-conductive, e.g., and substrate 302 may be conductive. In some examples where coating 304 is nonconductive, coating 304 may include uncoated areas or areas with conductive material, e.g., to provide an electrical connection from surface 306 to substrate 302.

In the example shown, coating 304 is disposed on one major surface of substrate 302. In some examples, conductive sampling swab 210 may include a coating 304 on both major surfaces of substrate 302 (e.g., on both sides of substrate 302, not shown), and may further include any associated primer/binder layers between substrate 302 and either coating 304, and the coatings 304 on both sides of substrate 302 may be the same as each other, or may be different from each other, and may be any of the coatings 304 described herein.

In some examples, coating 304 may be substantially non-absorbent. In some examples, coating 304 and may be configured to seal substrate 302, e.g., coating 304 may be substantially impermeable to a gas or fluid, such as air, water, and/or water vapor.

Surface 306 may be configured to pick up and/or capture sample material. In some examples, surface 306 may be configured to be substantially smooth and/or planar. In other examples, surface 306 may be configured to have a surface roughness. For example, surface 306 may have a surface arithmetic roughness average (Ra) of greater than or equal to 0.1 micrometers, greater than or equal to 0.2 micrometers, greater than or equal to 0.25 micrometers, greater than or equal to 0.45 micrometers, or greater than or equal to 0.6 micrometers. In some examples, surface 306 may have a surface roughness from being abraded with an abrasive, e.g., 240 grit sandpaper. In some examples, the sample material may be at least one of an explosive, a narcotic, a chemical warfare agent, a pesticide, a toxic industrial chemical, or a pharmaceutical trace contaminant, or at least one of sodium nitrate, potassium nitrate, strontium nitrate, barium nitrate, sodium chlorate, potassium chlorate, sodium perchlorate, potassium perchlorate, sodium permanganate, or potassium permanganate.

Conductive sampling swab 210 may be configured to be inductively heated to a temperature sufficient to vaporize the sample material, e.g., via the application of an alternating current through induction coil 120 or 240 by a thermal desorber, e.g., thermal desorber 102 (FIG. 1) to induce eddy currents and/or hysteresis losses within conductive sampling swab 210. In some examples, the temperature sufficient to vaporize the sample material is greater than or equal to 500° C., or greater than or equal to 700° C. In some examples, conductive sampling swab 210 may configured to be reused.

Conductive sampling swab 210 may be substantially elastic, that is, substrate 302 and coating 304 may resume their normal shape after being stretched or compressed. For example, conductive sampling swab 210 may be configured to be bent, stretched, or otherwise deformed, e.g., to at least partially conform to the shape of a surface that an operator is swiping with conductive sampling swab 210, and return to its original size and/or shape after being bent, stretched, or deformed. In some examples, conductive sampling swab 210, or either of substrate 302 or coating 304, may have a Young's modulus greater than or equal to 9,000 kilopounds per square inch (ksi) and/or a resistivity greater than or equal to 5 microOhm-centimeters ($\mu\Omega$-cm). In some examples, conductive sampling swab 210 may be magnetized by an application of an external magnetic field.

Figure 3B:
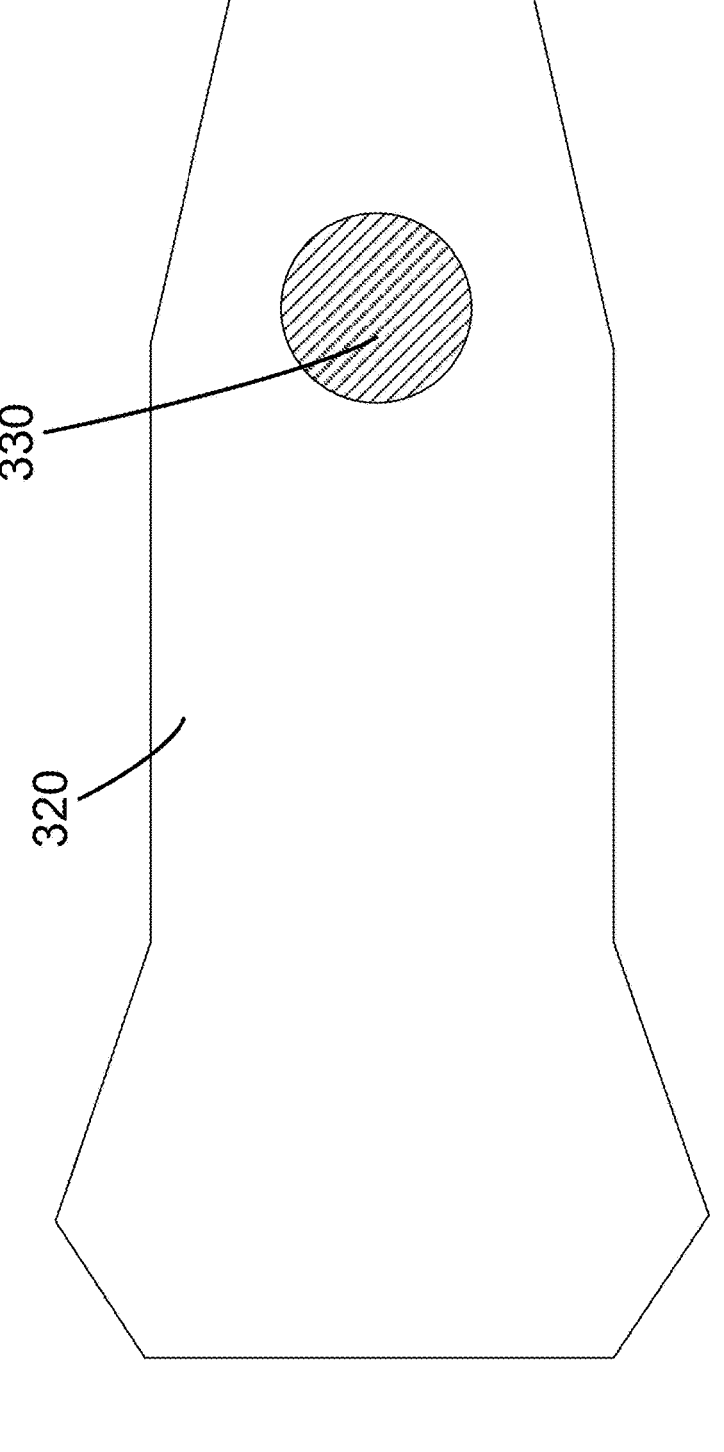
FIG. 3B is a top view of another example conductive sampling swab.

FIG. 3B is a top view of example conductive sampling swab 210. In the example shown, conductive sampling swab 210 includes substantially electrically conductive portion 330 and substantially electrically nonconductive portion 320. Conductive sampling swab 210 may comprise an electrically conductive material disposed on an electrically nonconductive material. For example, conductive sampling swab 210 may comprise a conductive material, e.g., 1095 spring steel, sputtered, coated, laminated to, or otherwise disposed on a portion of a nonconductive material, such as Nomex®. In some examples, conductive sampling swab 210 comprising conductive portion 330 and nonconductive portion 320 may exhibit behavior and benefits of both regular (e.g., relatively slower) and flash heating methods simultaneously during the same desorption event. For example, conductive portion 330 may be inductively flash heated, and may then heat adjacent portion of nonconductive portion 320 at a relatively slower rate, and both conductive portion 330 and nonconductive portion 320 may have been swabbed so as to have sample material disposed on a surface of both conductive portion 330 and nonconductive portion 320. Conductive portion 330 and nonconductive portion 320 may be made of any of the respective conductive and nonconductive materials described above, such as conductive materials used for substrate 302 and/or coating 304 described above. For example, conductive portion 330 may comprise a metal foil, a carbon steel, a spring steel, such as 1095 spring steel, or any suitable metal or alloy or combination thereof. Nonconductive portion 320 may be made of any suitable electrically nonconductive material, e.g., quartz, Nomex®, or the like, or such as described with reference to substrate 302 as a nonconductive substrate.

Figure 3C:
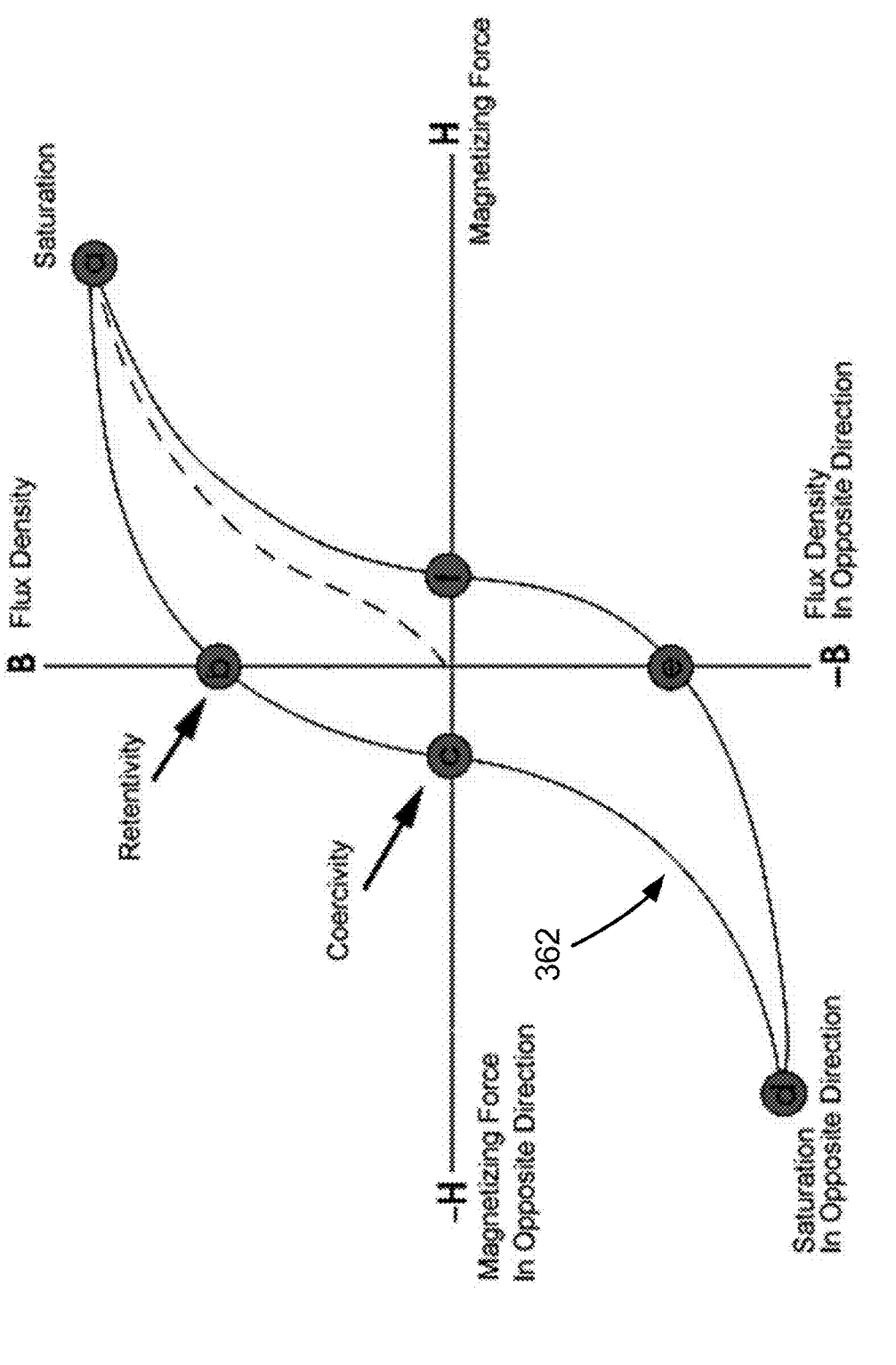
FIG. 3C is an example hysteresis plot illustrating magnetic properties of an example conductive sampling swab.

At least a portion of conductive sampling swab 210 is magnetic, such that conductive sampling swab 210 may be inductively heated. Such portion may include materials selected for magnetic properties that enable the portion of conductive sampling swab 210 to generate heat sufficient to vaporize a sample material, and in some instances, in a short amount of time. FIG. 3C is an example hysteresis plot 360 illustrating magnetic properties of conductive sampling swab 210. For example, hysteresis plot 360 may be a hysteresis loop of conductive sampling swab 210. In the example shown, plot 360 may show a hysteresis loop 362 of at least a portion of conductive sampling swab 210 inserted within the volume defined by induction coil 240 and an alternating current applied to induction coil 240. Plot 360 illustrates the relationship between the magnetizing force, H, and flux density, B, between magnetic saturation. The area of the hysteresis loop 362 may be indicative of the energy required to complete a full cycle of magnetizing and demagnetizing conductive sampling swab 210 disposed within induction coil 240. The area of hysteresis loop 362 may represent energy lost during the cycle, e.g., which may be lost via conversion to heat which contributes to heating conductive sampling swab 210. Hysteresis loop 362 may be mathematically represented by equation 1:

$$P = \eta * B_{max}^{n} * f * V \qquad (1)$$

where P is the hysteresis loss (in Watts), $\eta$ is the Steinmetz hysteresis coefficient (in Joules per meter squared) which may be material dependent, $B_{max}$ is the maximum flux density (in Webers per meter squared), n is the Steinmetz exponents, which may range from 1.5 to 2.5 depending on material (e.g., n may be about 1.6 for steels, such as 1095 spring steel), f is the frequency of magnetic reversals per second (in Hertz, or Hz), and V is the volume of the magnetic material in meters cubed, e.g., the volume of conductive sampling swab 210 that is within the volume defined by induction coil 240.

Certain material properties of conductive sampling swab 210 may determine the area of hysteresis loop 362. These material properties may include, but are not limited to, coercivity, retentivity, residual magnetism (e.g., sub-saturation retentivity), reluctance, magnetic permeability, and other properties that may be related to an amount of heat generated in response to an alternating magnetic field. For example, the coercivity (also referred to as a magnetic coercivity, coercive field, or coercive force), may be indicative of an ability of a material to withstand an opposing external magnetic field without becoming demagnetized, and may be measured in units of oersted or ampere per meter. The retentivity (also referred to as remanence, remanent magnetization, or residual magnetism) may be indicative of the magnetization left behind in a material after an external magnetic field is removed, and may be measured in units of Tesla. The magnetic saturation represents a threshold magnetic flux density that may be reached by a material in response to an applied magnetic field.

As mentioned above, inductive heating may also result of eddy currents generated in response to an alternative magnetic field from an induction coil. However, heat generated in conductive sampling swab 210 as a result of these eddy currents may be dependent on a resistivity of the conductive sampling swab. In contrast, induction heating that results from hysteresis losses may be independent of resistivity. Additionally or alternatively, various materials capable of induction heating, such as ferritic or martensitic stainless steels, may include alloying elements, such as chromium and nickel, configured increase chemical or mechanical properties that are particularly suited for components in corrosive or high load environments. In contrast, conductive sampling swab 210 may not require such chemical or mechanical properties. As a result, conductive sampling swab 210 may be selected for magnetic properties in combination with other advantageous properties, such as elasticity, for a particular application of trace detection through vaporization with less consideration for chemical, mechanical, or electrical properties.

Figure 4:
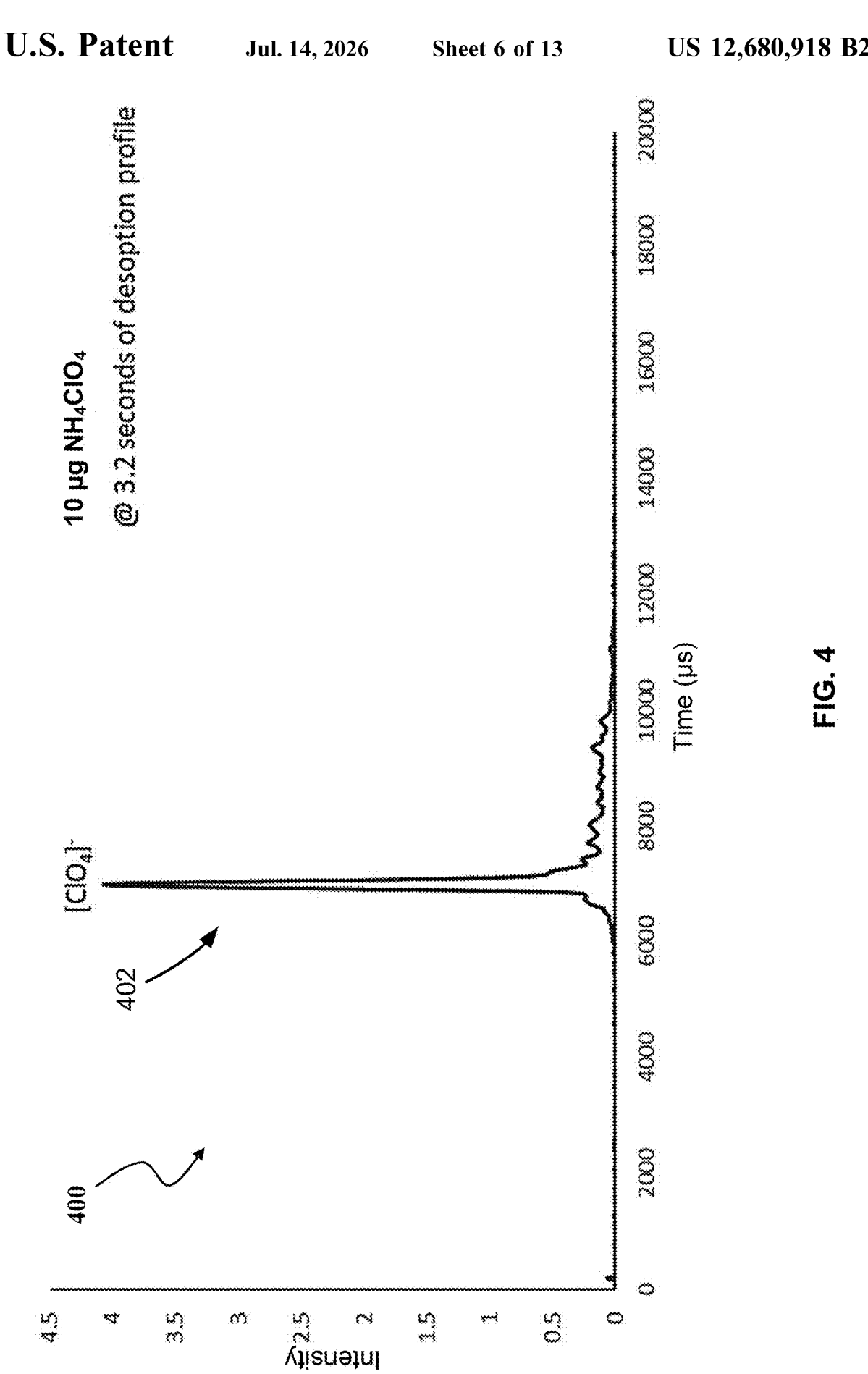
FIG. 4 is a plot of an example ion mobility plasmagram of an ammonium perchlorate ($NH_4ClO_4$) trace sample collected via an example trace detection system.
Figure 5A:
FIG. 5A is a plot of an example ion mobility plasmagram of a potassium chlorate ($KClO_3$) trace sample collected via an example trace detection system.
Figure 5B:
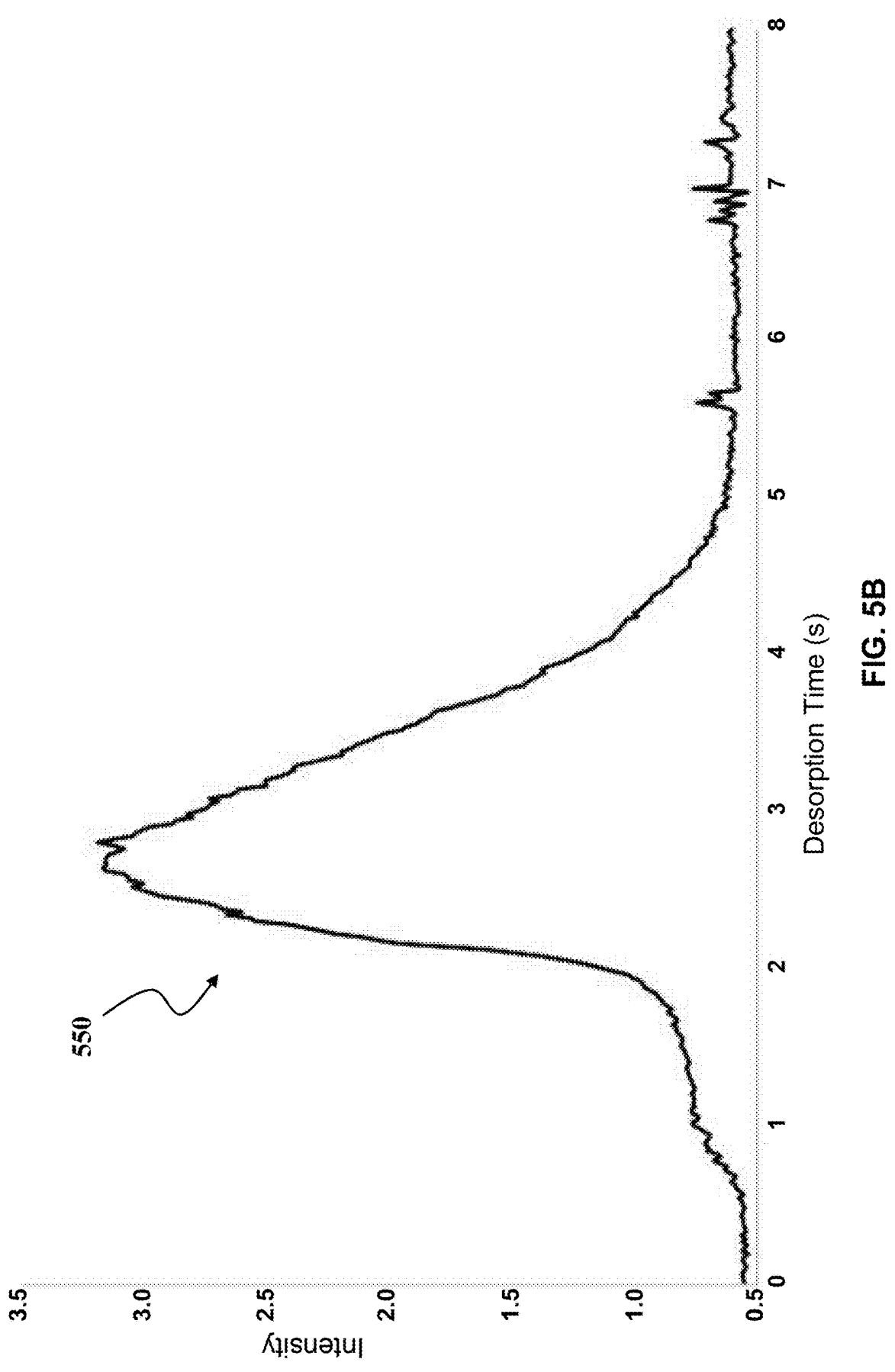
FIG. 5B is a plot of an example desorption profile of a potassium chlorate ($KClO_3$) trace sample collected via an example trace detection system.
Figure 6A:
FIG. 6A is a plot of an example ion mobility plasmagram of a potassium perchlorate ($KClO_4$) trace sample collected via an example trace detection system.
Figure 6B:
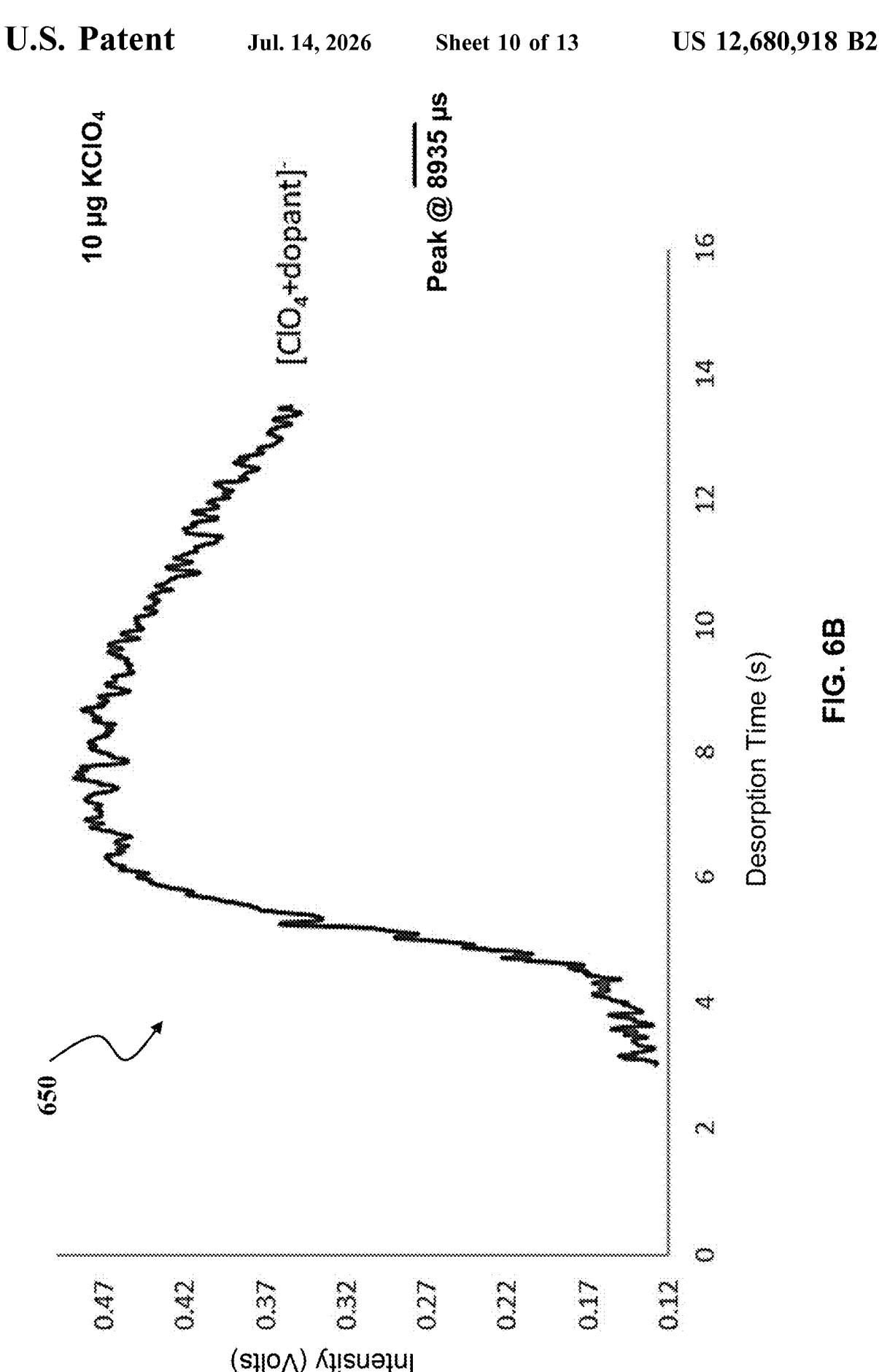
FIG. 6B is a plot of an example desorption profile of a potassium perchlorate ($KClO_4$) trace sample collected via an example trace detection system.

Trace detection systems described herein may detect various sample materials, including at high temperatures, with reduced accumulation of environmental contaminants, as illustrated in FIGS. 4-7 below. FIG. 4 is a plot of an example ion mobility plasmagram of an ammonium perchlorate sample. In the example shown, plot 400 may be an ion mobility plasmagram of an ion mobility-based trace detector operating in a negative mode. In the example shown, 1 microliter of ammonium solution was directly deposited on conductive sampling swab 210 and dried out. In the example shown, conductive sampling swab 210 used comprises 1095 spring steel foil having a 0.001 inch thickness FIG. 5A is a plot of an example ion mobility plasmagram 500 of a collected potassium chlorate ($KClO_3$) sample using ion mobility-based trace detector operating in a negative mode. FIG. 5B is a plot of an example desorption profile 550 of a collected $KClO_3$ sample. FIG. 6A is a plot of an example ion mobility plasmagram 600 of a collected potassium perchlorate ($KClO_4$) sample using an ion mobility-based trace detector operating in a negative mode. FIG. 6B is a plot of an example desorption profile 650 of a collected $KClO_4$ sample. FIGS. 5A, 5B, 6A, and 6B are described concurrently below.

Inorganic salts represent a class of substances with vapor pressure much lower than a vast majority of explosive or narcotics substances. At the same time, there is a pressing need to detect these substances at trace levels together with other substances of interest using the same detection system. Potassium chlorate ($KClO_3$) and potassium perchlorate ($KClO_4$) represent practical examples of low volatility samples and are inorganic salts with melting points of 356° C. and 525° C., respectively.

In the examples shown, nanograms level solutions of $KClO_3$ and $KClO_4$ salts in water were directly deposited on a conductive sampling swab 210. Conductive sampling swab 210 was made of 1095 carbon steel foil having a 0.002 inch thickness. The solutions were then dried out. Conductive sampling swab 210 was then rapidly heated, e.g., via thermal desorber 102 of FIG. 1, with an AC electric current of approximately 10A (RMS) applied to induction coil 240 at a frequency of 150 kilohertz (kHz) for 5 seconds of heating duration. Conductive sampling swab 210 reached a temperature of approximately 700° C. Desorption profiles 500, 550, 600, and 650 may indicate an amount of desorption of a sample material from conductive sampling swab 210.

Figure 7:
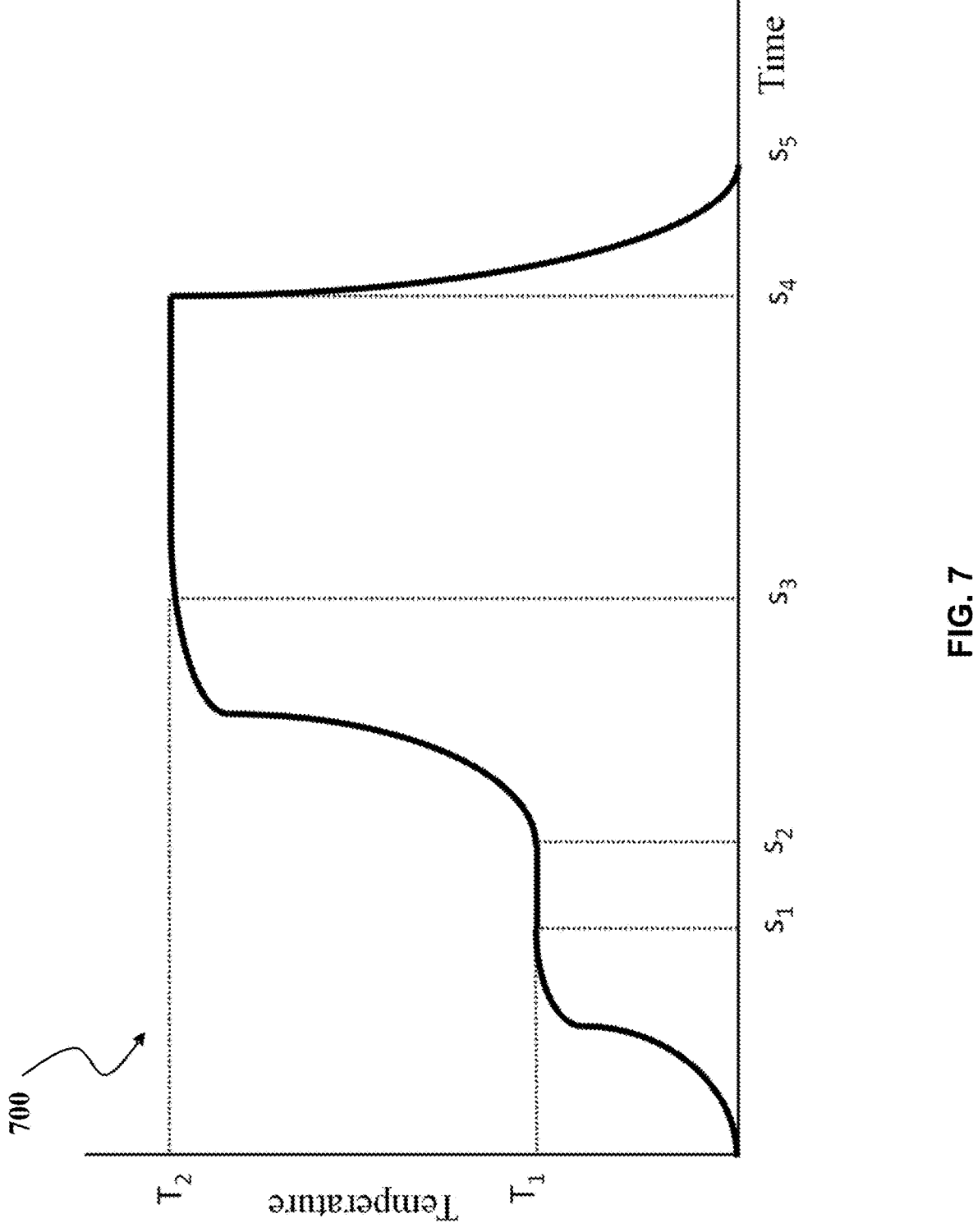
FIG. 7 is a plot of an example heating temperature profile for a conductive thermal sampling swab.

FIG. 7 is a plot of an example heating temperature profile 700 for a conductive sampling swab. In some examples, a thermal desorber may be configured to cause a conductive sampling swab to have temperature profile 700, e.g., via inductive heating. For example, conductive sampling swab 210 may be inserted into thermal desorber 102 comprising an induction coil 120 and/or 240 in close proximity to the conductive sampling swab 210. Computing device 192 (or computing device 28 described below) may be configured to cause data acquisition/control module 190 to activate electric current controller 170 to provide a current through induction coil 120 and/or 240 according to a pre-programmed time profile and/or pattern, e.g., to heat conductive sampling swab over a period of time to the temperature profile 700. For example, the temperature of conductive sampling swab 210 may be proportional to the current applied to induction coil 120 and/or 240 by current controller 170.

In some examples, computing device 192 may be configured to enhance the sensitivity of chemical analysis device 180 toward one or more samples of interest, or certain groups of substances of interest. In the example shown, temperature profile 700 increases to a first temperature T1 within an amount of time between zero seconds and time s1, e.g., for an amount of time s1. The temperature remains substantially constant at T1, e.g., the temperature "plateaus" at a first plateau for an amount of time between times s1 and s2. The temperature then increases to a second, higher temperature T2 between times s2 and s3, e.g., for an amount of time s3-s2, and remains relatively constant at a second plateau at T2 between times t3 and t4, e.g., for an amount of time t4-t3. Computing device 192 may be configured to enhance the sensitivity of chemical analysis device 180 by causing the temperature of conductive sampling swab 210 to follow temperature profile 700, and a first sample of interest may desorb at the first temperature T1 between times s1 and s2 for analysis by chemical analysis device 180. A second sample of interest may have a higher desorption temperature, and may not desorb from conductive sampling swab 210 between times s1 and s2. The second sample of interest may instead desorb at higher temperature T2 between times s3 and s4 for analysis by chemical analysis device 180. The time between s1 and s2 may be such that all of the first sample is desorbed between times s1 and s2, and only the second sample of interest is desorbed between times s3 and s4. In some examples, inductively heating conductive sampling swab 210 may improve and/or increase the range of temperature profiles for use with conductive sampling swab 210. For example, inductively heating conductive sampling swab 210 may enable steeper or less steep slopes between temperatures, e.g., between room temperature, T1, and T2, enable higher temperatures, e.g., T1 and/or T2, and/or the ability to keep conductive sampling swab 210 at a temperature (e.g., T1 and/or T2) over shorter, the same, or longer periods of time with increased stability and/or reduced temperature variation.

In other examples, computing device 192 may be configured to cause data acquisition/control module 190 to activate electric current controller 170 to provide a current through induction coil 140 and/or 240 to achieve a different temperature profile 700 of conductive sampling swab 210, or any suitable temperature profile 700 of conductive sampling swab 210. For example, computing device 192 may cause conductive sampling swab 210 to have a temperature profile 700 with more or fewer plateaus, temperature ramp ups and ramp downs with any suitable shape, e.g., linear, quadratic, any higher order polynomial shape, exponential, or any more or less complex temperature profile shape. For example, computing device 192 may be preprogrammed to cause both the current and/or voltage to be applied to induction coil 140 and/or 240 to have any suitable temperature profile 700 to enhance the sensitivity of chemical analysis device 180 toward one or more samples of interest.

Figure 8:
FIG. 8 is a flow diagram of an example method of detecting a trace amount of a low volatility sample material.
Figure 8:
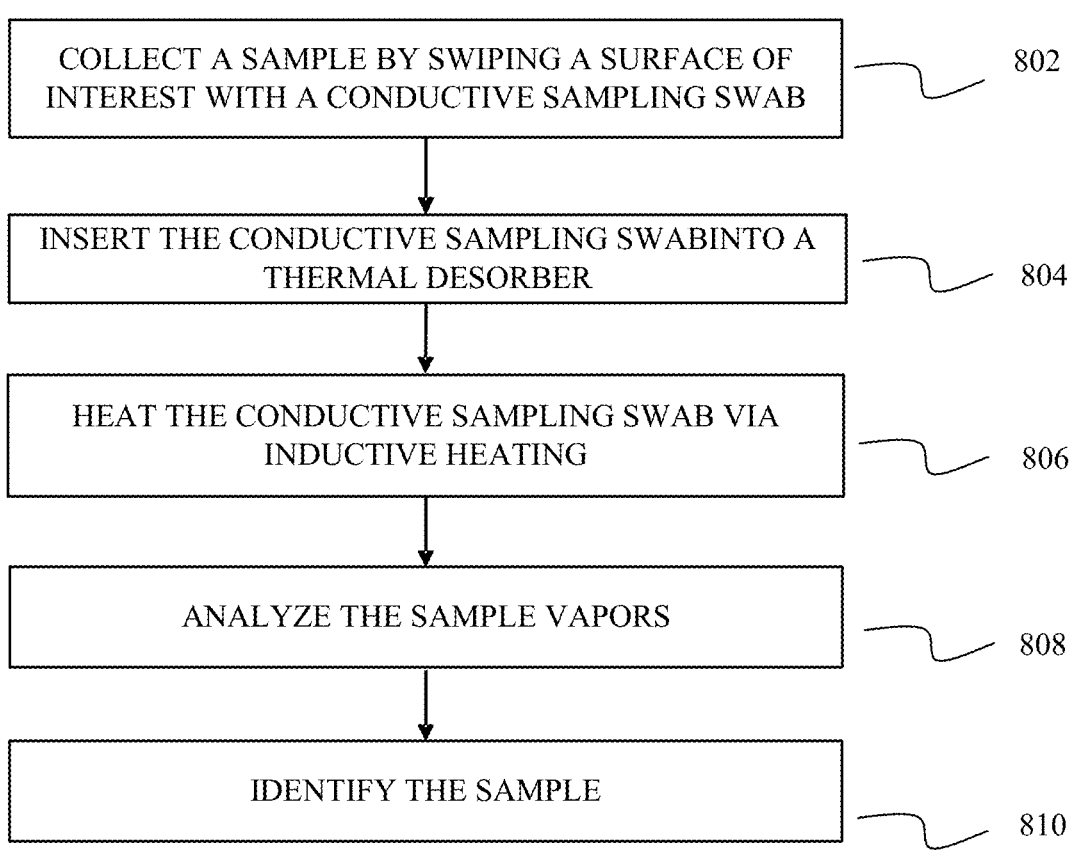

FIG. 8 is a flow diagram of an example method 800 of detecting a trace amount of a low volatility sample material. Although FIG. 8 is discussed using trace detection system 100 of FIG. 1, inductive coil 120 and/or 240 of FIGS. 1 and 2, computing device 28 of FIG. 9, and conductive sampling swab 210 of FIGS. 2-3C, it is to be understood that the methods discussed herein may include and/or utilize other systems and methods in other examples.

An operator (e.g., a user, a person) may collect a sample of a material and/or substance of interest by swiping a surface of interest with conductive sampling swab 210 (802). The operator may insert conductive sampling swab 210 at least partially within an internal volume defined by inductive coil 120 and/or 240 within thermal desorber 102 (804). Conductive sampling swab 210 may comprise an impermeable substrate, e.g., substrate 302.

Computing device 28 may cause electric current controller 170 to heat conductive sampling swab 210 via applying an alternating electric current through induction coil 120 and/or 240 (806). For example, computing device 28 may cause data acquisition/control module 190 to activate electric current controller 170 to provide an alternating electric current through induction coil 120 and/or 240. The alternating electric current may be constant (e.g., a constant waveform) or varied in time. Computing device 28 may control, in real time, the intensity of the electric current and duration of a desorption interval or period, or the intensity of the electric current and duration of a desorption interval or period may be pre-programmed at a hardware level. In some examples, electric current controller 170 may provide the electric current in a pulsed fashion (for example, using pulse-width and/or pulse-frequency modulation).

Computing device 28 may cause electric current controller 170 to inductively heat conductive sampling swab 210 to a temperature sufficient to cause full or partial vaporization of the sample material disposed on conductive sampling swab 210, e.g., to a temperature greater than or equal to 500° C., or 700° C. A vapor collection assembly and vapor conduit 164, or transfer line 280, may then transport the generated vapors of the sample material to a trace detection system, e.g., chemical analysis device 180. In some examples, computing device 28 may cause current controller 170 to heat conductive sampling swab 210 repeatedly, e.g., according to a set of time intervals. In some examples, each time interval may have a different electric current amplitude, intensity, frequency and/or duration. In some examples, computing device 28 may cause current controller 170 to heat conductive sampling swab 210 with a varied time duration and varied current amount, e.g., a varied time and current amount specific to vaporize a specific sample material and/or chemical substance. In some examples, computing device 28 may cause current controller 170 to flash heat conductive sampling swab 210 to the temperature sufficient to vaporize the sample material disposed on the conductive sampling swab, e.g., in eight seconds or less, or in five seconds or less, or in two seconds or less. In some examples, computing device 28 may cause current controller 170 to heat conductive sampling swab 210 according to a temperature profile, e.g., temperature profile 700 of FIG. 7.

Computing device 28 may cause chemical analysis device 180 to analyze the sample vapors (808). In some examples, analysis at (808) may occur at least partially simultaneously with heating at (806).

Computing device 28 may identify the sample material (810). For example, trace detection control unit 20 may receive analysis data from chemical analysis device 180 and may determine the presence of vaporized sample material, a composition of the sample material, an amount of the sample material, and/or an amount of each component of the composition of the sample material.

In some examples, method 800 may be used to identify a sample material comprising at least one of an explosive, a narcotic, a chemical warfare agent, a pesticide, a toxic industrial chemical, or a pharmaceutical trace contaminant. In some examples, method 800 may be used to identify a sample material comprising at least one of sodium nitrate, potassium nitrate, strontium nitrate, barium nitrate, sodium chlorate, potassium chlorate, sodium perchlorate, potassium perchlorate, sodium permanganate, or potassium permanganate.

Figure 9:
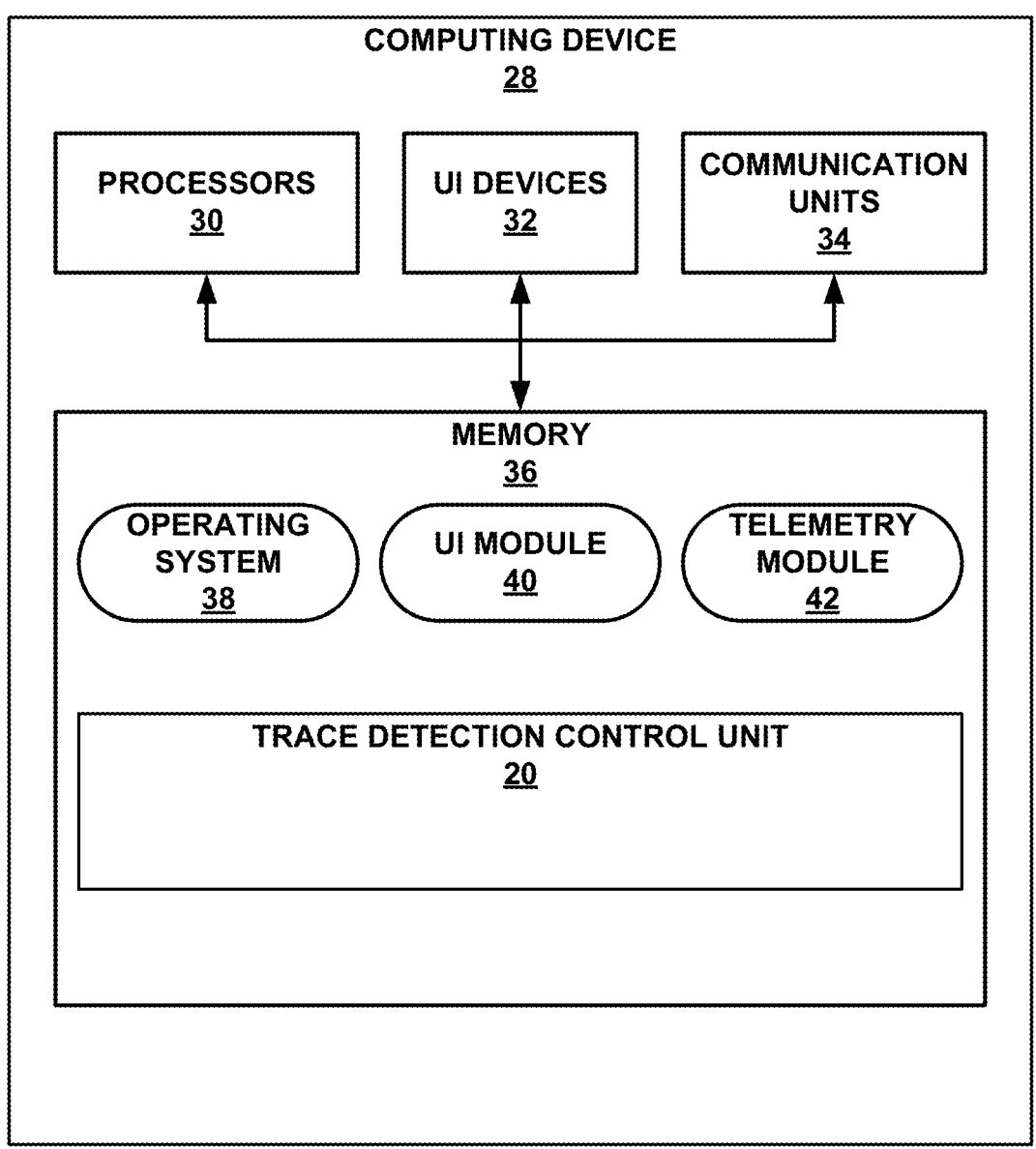
FIG. 9 is a block diagram illustrating an example computing device configured to control a trace detection system.

FIG. 9 is a block diagram illustrating an example computing device 28 configured to control a trace detection system. In some examples, computing device 28 may be substantially similar to computing device 190 of FIG. 1.

As shown in the example of FIG. 9, computing device 28 includes one or more processors 30, one or more user interface (UI) devices 32, one or more communication units 34, and one or more memory units 36. Memory 36 of computing device 28 includes operating system 38, UI module 40, telemetry module 42, and trace detection control unit 20, which are executable by processors 30. Each of the components, units or modules of computing device 28 are coupled (physically, communicatively, and/or operatively) using communication channels for inter-component communications. In some examples, the communication channels may include a system bus, a network connection, an interprocess communication data structure, or any other method for communicating data.

Processors 30, in one example, may comprise one or more processors that are configured to implement functionality and/or process instructions for execution within computing device 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 28 (e.g., trace detection control unit 20) to temporarily store information during program execution.

Computing device 28 may utilize communication units 34 to communicate with external devices via one or more networks or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 28 utilizes communication units 34 to wirelessly communicate with an external device, such as electric current controller 170, chemical analysis device 180, and data acquisition/control module 190 from FIG. 1.

UI devices 32 may be configured to operate as both input devices and output devices. For example, UI devices 32 may be configured to receive tactile, audio, or visual input from a user of computing device 28. In addition to receiving input from a user, UI devices 32 may be configured to provide output to a user using tactile, audio, or video stimuli. In one example, UI devices 32 may be configured to output content, such as a GUI, for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 28. For example, operating system 38, in one example, facilitates the communication of UI module 40, telemetry module 42, and trace detection control unit 20 with processors 30, UI devices 32, communication units 34, and memory 36. UI module 40, telemetry module 42, and trace detection control unit 20 may each include program instructions and/or data stored in memory 36 that are executable by processors 30. For example, trace detection control unit 20 may include instructions that cause computing device 28 to perform one or more of the techniques described in this disclosure.

Computing device 28 may include additional components that, for clarity, are not shown in FIG. 9. For example, computing device 28 may include a battery to provide power to the components of computing device 28. Similarly, the components of computing device 28 shown in FIG. 9 may not be necessary in every example of computing device 28.

In the example illustrated in FIG. 9, trace detection control unit 20 may be configured to control trace detection system 100 and/or any of its components, e.g., thermal desorber 102, clamping assembly 104, electric current controller 170, chemical analysis device 180, data acquisition/control module 190, and/or any other hardware of trace detection system 100, e.g., a fan to move vapor 112 to chemical analysis device 180, and the like. In some examples, trace detection control unit 20 may be configured to determine any of the presence of vaporized sample material, a composition of sample material, an amount of the sample material, and/or an amount of each component of the composition of the sample material, e.g., based on data received from data acquisition/control module 190 and/or chemical analysis device 180 telemetry module 42. In some examples, trace detection control unit 20 may cause computing device and/or processors 30 to execute portions of method 800 described above.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit and/or control system including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache). This disclosure includes the following non-limiting examples.

Example 1: A system including: a conductive sampling swab; and a thermal desorber comprising an induction coil, wherein the thermal desorber defines an opening configured to receive at least a portion of the conductive sampling swab within an internal volume defined by the induction coil, wherein the thermal desorber is configured to inductively heat the sampling swab to a temperature sufficient to vaporize a sample material disposed on the sampling swab.

Example 2: The system of example 1, wherein the conductive sampling swab comprises a metal foil.

Example 3: The system of example 2, wherein the metal foil comprises at least one of 1095 carbon steel, a spring steel, or a non-ferritic, non-austenitic, and non-martensitic steel.

Example 4: The system of any one of examples 1 through 3, wherein the conductive sampling swab has a Young's modulus greater than or equal to 9,000 kilopounds per square inch (ksi), and wherein the conductive sampling swab may be magnetized by an application of an external magnetic field.

Example 5: The system of any one of examples 1 through 4, wherein the conductive sampling swab has a surface arithmetic roughness average (Ra) of greater than or equal to 0.25 micrometers.

Example 6: The system of example 5, wherein the conductive sampling swab comprises at least one of a graphite coating or a graphene coating disposed on a non-mesh substrate.

Example 7: The system of any one of examples 1 through 6, wherein the conductive sampling swab is configured to be reusable and replaceable.

Example 8: The system of any one of examples 1 through 7, wherein the induction coil has at least one of a flat spiral shape or a cylindrical shape.

Example 9: The system of any one of examples 1 through 8, wherein the induction coil comprises an air-core coil.

Example 10: The system of any one of examples 1 through 9, wherein the temperature sufficient to vaporize the sample material disposed on the conductive sampling swab is greater than or equal to 500 degrees Celsius.

Example 11: The system of any one of examples 1 through 10, wherein the thermal desorber is configured to at least one of flash heat the conductive sampling swab or heat the conductive sampling swab according to a temperature profile.

Example 12: The system of any one of examples 1 through 11, wherein the sample material comprises at least one of an explosive, a narcotic, a chemical warfare agent, a pesticide, a toxic industrial chemical, or a pharmaceutical trace contaminant.

Example 13: The system of any one of examples 1 through 12, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

Example 14: A method including: inserting a conductive sampling swab at least partially within an internal volume defined by an inductive coil of a thermal desorber; inductively heating the conductive sampling swab, with the induction coil, to a temperature sufficient to vaporize a sample material disposed on the conductive sampling swab.

Example 15: The method of example 14, wherein the conductive sampling swab comprises a metal foil.

Example 16: The method of example 15, wherein the metal foil comprises at least one of 1095 carbon steel or a spring steel.

Example 17: The method of any one of examples 14 through 16, wherein the conductive sampling swab has a Young's modulus greater than or equal to 9,000 kilopounds per square inch (ksi), wherein the conductive sampling swab may be magnetized by an application of an external magnetic field.

Example 18: A conductive sampling swab including: a non-mesh substrate, wherein the conductive sampling swab is configured to be inductively heated to a temperature sufficient to vaporize a sample material disposed on the conductive sampling swab.

Example 19: The conductive sampling swab of example 18, wherein the non-mesh substrate comprises a metal foil comprising at least one of 1095 carbon steel or a spring steel.

Example 20: The conductive sampling swab of any of examples 18 and 19, wherein the temperature sufficient to vaporize the sample material is greater than or equal to 500 degrees Celsius.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Based upon the above discussion and illustrations, it is recognized that various modifications and changes may be made to the disclosed technology in a manner that does not necessarily require strict adherence to the examples and applications illustrated and described herein. Such modifications do not depart from the true spirit and scope of various aspects of the disclosure, including aspects set forth in the claims.

What is claimed is:

1. A system comprising:
a conductive sampling swab comprising a non-austenitic, non-martensitic spring steel; and
a thermal desorber comprising an induction coil, wherein the thermal desorber defines an opening configured to receive at least a portion of the conductive sampling swab within an internal volume defined by the induction coil, wherein the thermal desorber is configured to inductively heat the sampling swab to a temperature sufficient to vaporize a sample material disposed on the sampling swab.

2. The system of claim 1, wherein the conductive sampling swab comprises a metal foil comprising the non-austenitic, non-martensitic spring steel.

3. The system of claim 2, wherein the metal foil further comprises at least one of 1095 carbon steel, a spring steel, or a non-ferritic, non-austenitic, and non-martensitic steel.

4. The system of claim 1,
wherein the conductive sampling swab has a Young's modulus greater than or equal to 9,000 kilopounds per square inch (ksi), and
wherein the conductive sampling swab is configured to be magnetized by an application of an external magnetic field.

5. The system of claim 1, wherein the conductive sampling swab has a surface arithmetic roughness average (Ra) of greater than or equal to 0.25 micrometers.

6. The system of claim 5, wherein the conductive sampling swab comprises at least one of a graphite coating or a graphene coating disposed on a non-mesh substrate.

7. The system of claim 1, wherein the conductive sampling swab is configured to be reusable and replaceable.

8. The system of claim 1, wherein the induction coil has at least one of a flat spiral shape or a cylindrical shape.

9. The system of claim 1, wherein the induction coil comprises an air-core coil.

10. The system of claim 1, wherein the temperature sufficient to vaporize the sample material disposed on the conductive sampling swab is greater than or equal to 500 degrees Celsius.

11. The system of claim 1, wherein the thermal desorber is configured to at least one of flash heat the conductive sampling swab or heat the conductive sampling swab according to a temperature profile.

12. The system of claim 1, wherein the sample material comprises at least one of an explosive, a narcotic, a chemical warfare agent, a pesticide, a toxic industrial chemical, or a pharmaceutical trace contaminant.

13. The system of claim 1, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

14. A method comprising:
inserting a conductive sampling swab at least partially within an internal volume defined by an inductive coil of a thermal desorber; and
inductively heating the conductive sampling swab, with the induction coil, to a temperature sufficient to vaporize a sample material disposed on the conductive sampling swab,
wherein the conductive sampling swab comprises a non-austenitic, non-martensitic spring steel.

15. The method of claim 14, wherein the conductive sampling swab comprises a metal foil comprising the non-austenitic, non-martensitic spring steel.

16. The method of claim 15, wherein the metal foil further comprises at least one of 1095 carbon steel or a spring steel.

17. The method of claim 14, wherein the conductive sampling swab has a Young's modulus greater than or equal to 9,000 kilopounds per square inch (ksi), and
wherein the conductive sampling swab is configured to be magnetized by an application of an external magnetic field.

18. A conductive sampling swab comprising:
a non-mesh substrate comprising a non-austenitic, non-martensitic spring steel,
wherein the non-mesh substrate is configured to be inductively heated to a temperature sufficient to vaporize a sample material disposed on the non-mesh substrate.

19. The conductive sampling swab of claim 18, wherein the non-mesh substrate comprises a metal foil comprising the non-austenitic, non-martensitic spring steel.

20. The conductive sampling swab of claim 18, wherein the temperature sufficient to vaporize the sample material is greater than or equal to 500 degrees Celsius.

* * * * *